United States Patent
Shatzkamer et al.

(10) Patent No.: US 8,555,350 B1
(45) Date of Patent: Oct. 8, 2013

(54) SYSTEM AND METHOD FOR ENSURING PERSISTENT COMMUNICATIONS BETWEEN A CLIENT AND AN AUTHENTICATION SERVER

(75) Inventors: Kevin Shatzkamer, New York, NY (US); Anand K. Oswal, Sunnyvale, CA (US); Chris O'Rourke, Apex, NC (US); Mark Grayson, Maidenhead (GB); Jayaraman Iyer, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1319 days.

(21) Appl. No.: 11/473,767

(22) Filed: Jun. 23, 2006

(51) Int. Cl.
G06F 7/00 (2006.01)

(52) U.S. Cl.
USPC .............. 726/5; 726/1; 726/2; 726/3; 726/15; 713/171; 713/155; 713/182; 380/247; 380/270; 709/223; 709/228; 370/229; 370/335; 370/338; 370/230; 370/249

(58) Field of Classification Search
USPC ............ 726/4, 5, 6, 1, 2, 3, 15; 713/171, 151, 713/182; 380/247, 270; 709/223, 228; 370/229, 230, 249, 335, 338
See application file for complete search history.

(56) References Cited

U.S. PATENT DOCUMENTS

| | | | |
|---|---|---|---|
| 6,374,297 B1 | 4/2002 | Wolf et al. | |
| 6,608,832 B2 * | 8/2003 | Forslow | 370/353 |
| 6,894,994 B1 * | 5/2005 | Grob et al. | 370/335 |
| 6,922,724 B1 | 7/2005 | Freeman et al. | |
| 6,928,469 B1 * | 8/2005 | Duursma et al. | 709/223 |
| 6,944,678 B2 | 9/2005 | Lu et al. | |
| 6,976,090 B2 | 12/2005 | Ben-Shaul et al. | |
| 7,020,090 B2 * | 3/2006 | Chandwadkar et al. | 370/249 |
| 7,076,562 B2 | 7/2006 | Singhal et al. | |

(Continued)

FOREIGN PATENT DOCUMENTS

| | | |
|---|---|---|
| CN | 101438609 | 5/2009 |
| EP | 2014109 | 11/2007 |
| WO | WO 2007/130290 | 11/2007 |

OTHER PUBLICATIONS

Cisco Systems, Inc., "Configuring Advanced Server Load Balancing," 3 pages; [Printed on May 3, 2006] http://cisco.com/en/US/products/hw/switches/ps708/module_installation_and _configuration_guides_capter09186a00800fec10.html.

(Continued)

*Primary Examiner* — Beemnet Dada
*Assistant Examiner* — Sayed Beheshti Shirazi
(74) *Attorney, Agent, or Firm* — Patent Capital Group

(57) ABSTRACT

A system for facilitating persistent communications between entities in a network. In a specific embodiment, the system is adapted to facilitate fast reauthentication of a client performed by a server, such as an Authentication, Authorization, and Accounting (AAA) server, that is coupled to the client via a load balancer. The system includes a first message to be exchanged between the server and the client, wherein the first message includes a field identifying the server and/or the client. A matching module communicates with or is otherwise incorporated within the load balancer. The matching module includes one or more routines for employing the field to selectively route the first message to the client and/or server. In a more specific embodiment, the server a fast reauthentication module adapted to append the field in the message. The field includes sub-realm information identifying the server.

14 Claims, 4 Drawing Sheets

(56) References Cited

U.S. PATENT DOCUMENTS

| | | | |
|---|---|---|---|
| 7,107,620 B2* | 9/2006 | Haverinen et al. | 726/29 |
| 7,152,160 B2 | 12/2006 | Lantto et al. | |
| 7,310,307 B1* | 12/2007 | Das et al. | 370/229 |
| 7,346,686 B2 | 3/2008 | Albert et al. | |
| 7,379,458 B2 | 5/2008 | Inoue et al. | |
| 7,421,454 B2 | 9/2008 | DeShan et al. | |
| 7,586,871 B2 | 9/2009 | Hamilton et al. | |
| 7,640,023 B2 | 12/2009 | Ma et al. | |
| 7,712,670 B2 | 5/2010 | Sauerwein et al. | |
| 7,948,889 B2 | 5/2011 | Lalonde et al. | |
| 2002/0012433 A1* | 1/2002 | Haverinen et al. | 380/247 |
| 2003/0074467 A1* | 4/2003 | Oblak et al. | 709/238 |
| 2003/0236982 A1* | 12/2003 | Hsu | 713/171 |
| 2004/0015701 A1* | 1/2004 | Flyntz | 713/182 |
| 2004/0066769 A1* | 4/2004 | Ahmavaara et al. | 370/338 |
| 2004/0153555 A1* | 8/2004 | Haverinen et al. | 709/229 |
| 2004/0168054 A1* | 8/2004 | Halasz et al. | 713/155 |
| 2005/0147249 A1* | 7/2005 | Gustavsson et al. | 380/247 |
| 2005/0188065 A1* | 8/2005 | O'Rourke et al. | 709/223 |
| 2006/0041939 A1* | 2/2006 | Schwartzman et al. | 726/15 |
| 2006/0168251 A1* | 7/2006 | Buchheit et al. | 709/228 |
| 2007/0058533 A1* | 3/2007 | Forissier et al. | 370/230 |
| 2007/0123208 A1* | 5/2007 | Batta et al. | 455/404.1 |
| 2007/0217610 A1* | 9/2007 | Yegani et al. | 380/270 |

OTHER PUBLICATIONS

PCT International Search Report mailed Aug. 6, 2008 for PCT/US07/09945; 1 page.

PCT International Preliminary Report on Patentability (1 page) and Written Opinion of the International Searching Authority (3 pages) mailed Nov. 4, 2008 for PCT/US07/09945.

IOS Server Load Balancing Feature in IOS Release 12.2(18)SXE; Cisco Systems, Inc. http://www.cisco.com/univercd/cc/td/doc/product/softwaret/ios122/122newft/122limit/122sx/12218sce/slbsxe1.htm#wp3633221 "RADIUS Load Balancing Configuration Task List", May 3, 2006.

"UMA Architecture (Stage 2), Unlicensed Mobile Access (UMA); Architecture (Stage 2)", Aquired at: http://kom.aau.dk/~ff/UMA/Stage2.pdf, 1 page, 2004 Alcatel, AT&T Wireless Services.

"UMA Technology", Aquired at: http://www.umatechnology.org/technology/index.htm, 2 pages, 2004-2005.

\* cited by examiner

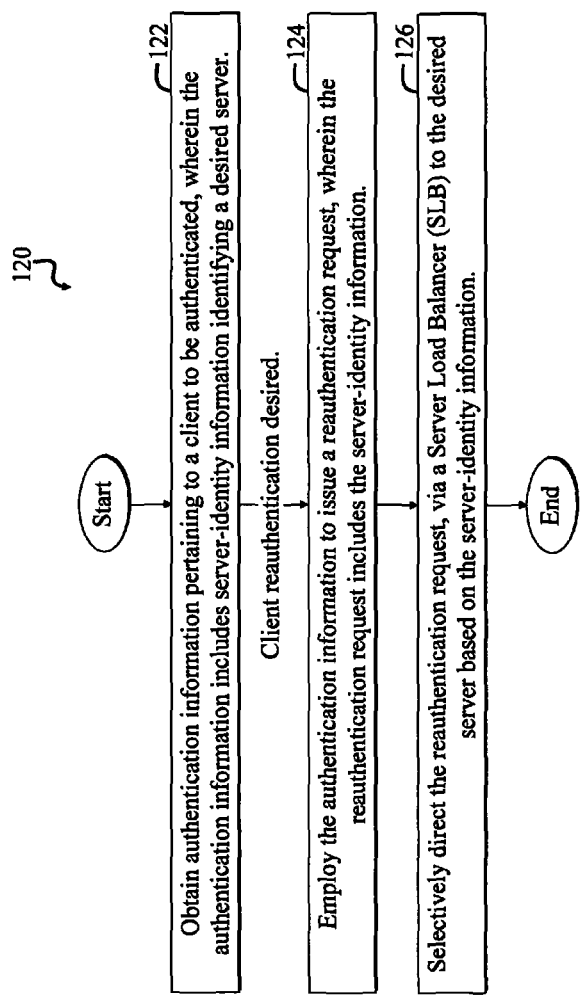

SYSTEM AND METHOD FOR ENSURING PERSISTENT COMMUNICATIONS BETWEEN A CLIENT AND AN AUTHENTICATION SERVER

BACKGROUND OF THE INVENTION

This invention is related in general to networks and more specifically relates to systems and methods for facilitating persistent communications between network entities, such as clients and authentication servers.

For the purposes of the present discussion, persistent communications may be communications that are consistently maintained so that communications occur between intended entities.

Systems and methods for ensuring persistent communications are employed in various demanding applications including fast reauthentication, Web browsing, and so on. Such applications often demand efficient mechanisms for ensuring that messages between a client and a server are appropriately sent between the client and the server. Systems and methods for ensuring persistent communications are particularly important in fast-reauthentication applications in wireless networks, such as Unlicensed Mobile Access (UMA), WiFi (e.g. IEEE 802.11 networks), Universal Mobile Telecommunications System (UMTS), cellular, and Public Wireless Local Area Networks (PWLANs), where a client must access the original authentication server for fast reauthentication.

An exemplary wireless network includes a wireless client coupled to multiple Authentication, Authorization, and Accounting (AAA) servers via one or more Server Load Balancers (SLBs) that front the AAA servers. The wireless client, also called a mobile station, may be a multimode phone, a laptop equipped with a wireless card, or other client.

When the client connects to the network, the client provides an identification number, such as an International Mobile Subscriber Identity (IMSI) number to an AAA server. The AAA server then runs an algorithm to facilitate authenticating the client based on the identification number. The AAA server may reference a Home Location Register (HLR) to access client authentication information, which may include information pertaining to what network services a given client may access. If the client momentarily loses contact with the network, reauthentication is performed.

Certain networks employ fast reauthentication. In fast reauthentication, the wireless client may be given reauthentication information by the AAA server that originally authenticated the wireless client. To request reauthentication, the wireless client incorporates the reauthentication information in a reauthentication request sent to the original AAA server. Unfortunately, in applications employing plural AAA servers that are fronted by one or more SLBs, the reauthentication information forwarded by the client may not be routed to the correct AAA server.

To facilitate persistent communications, also called stickiness, between a client and a server, a so-called sticky object pertaining to a given communication between a client and a server may be employed. The sticky object is inserted in a sticky database that is selectively accessed by an intervening SLB to determine how to route a given message from a client or corresponding server. Unfortunately, accessing a sticky database to ensure persistent communications may be undesirably time consuming and network-resource intensive. Furthermore, conventional use of sticky objects is often unsuitable in applications, such as fast reauthentication applications, where an intervening SLB may lack information pertaining to how certain reauthentication information sent by a client correlates with information in a sticky database. For example, an SLB may associate initial client authentication information with a sticky object. Unfortunately, fast reauthentication requests, which include fast reauthentication information, typically lack the initial client authentication information needed to employ the sticky object to accurately route reauthentication requests.

BRIEF DESCRIPTION OF THE DRAWINGS

FIG. 4 is a flow diagram of a second method adapted for use with the network of FIG. 1.

DETAILED DESCRIPTION OF EMBODIMENTS OF THE INVENTION

Figure 1:
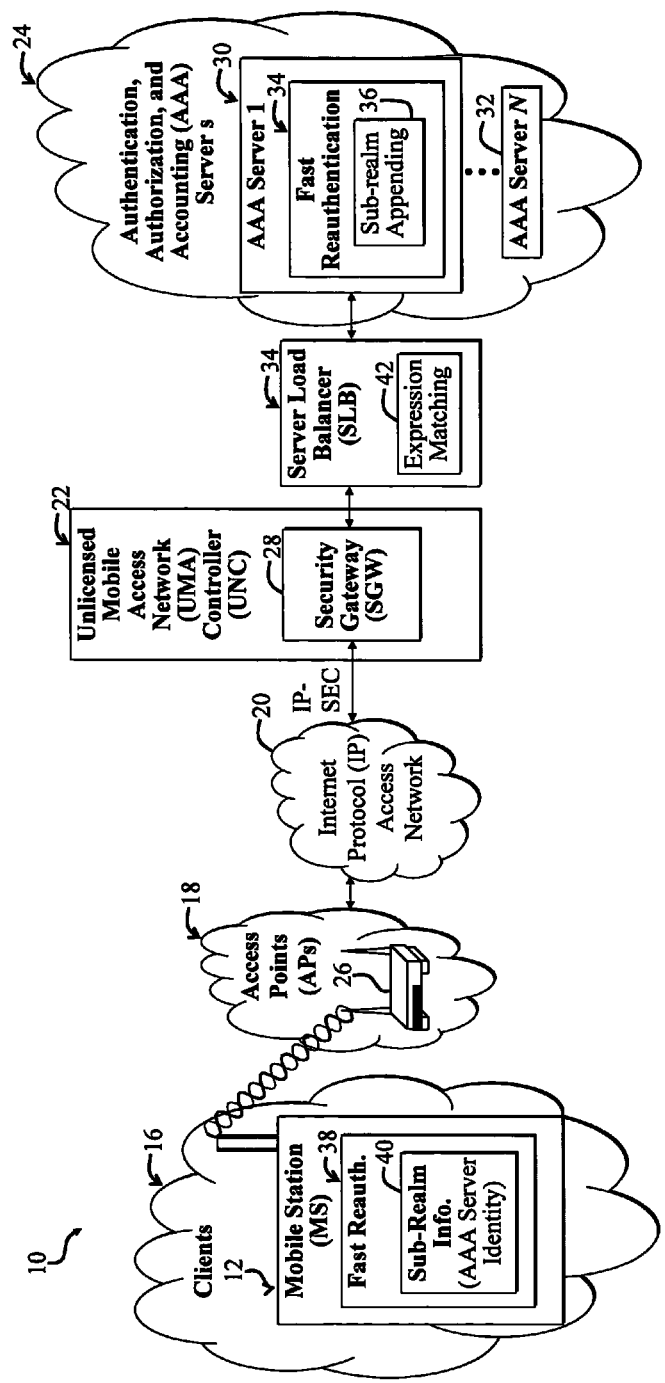
FIG. 1 is a diagram illustrating an Unlicensed Mobile Access (UMA) network adapted to facilitate persistent communications between a client and an Authentication, Authorization, and Accounting (AAA) server to facilitate fast reauthentication according to an embodiment of the present invention.

A preferred embodiment of the present invention implements a system and method for facilitating fast reauthentication of a client in a network. The network includes a client in communication with one or more Authorization, Authentication, and Accounting (AAA) servers via a Server Load Balancer (SLB) that fronts the one or more AAA servers. The AAA servers may facilitate implementing fast reauthentication, wherein reauthentication information is initially sent from an AAA server to the client after initial client authentication.

In the preferred embodiment, the reauthentication information includes server-identification information that indicates which real AAA server initially authenticated the client. Subsequently, when the client requests fast reauthentication, the client sends a reauthentication-request containing the server-identification information to the SLB. The server-identification information may be implemented as sub-realm information in a string with the following format: pseudo-IMSI@sub-realm. The pseudo-IMSI, which may be assigned to the client by an AAA server, represents an identification number assigned to the client to facilitate fast reauthentication. The pseudo-IMSI may be an IMSI that is generated by one or more routines implemented by the fast-reauthentication module 34 and that is based on the original IMSI that was used by the mobile station 12 for initial authentication. The sub-realm-appending module 36 may append, attach, insert, or otherwise tag the pseudo-IMSI and the sub-realm to/with fast-reauthentication messages transmitted by the AAA server 30 to the client 12. The sub-realm represents the server-identification information.

The SLB employs the server-identification information to route the reauthentication request to the AAA server that performed the initial authentication of the client and that sent the initial pseudo-IMSI to the client. For the purposes of the present discussion, a pseudo IMSI may be any identification number that is assigned to a mobile station or other network client to facilitate fast reauthentication of the client.

Incorporating server-identification information in the reauthentication-request message enables the SLB to perform so-called regular expression matching, wherein the reauthentication-request message is parsed, analyzed, and the server-identification information is matched to a real (as opposed to virtual) AAA server that is coupled to the SLB. The SLB then forwards the reauthentication-request message to the matched real AAA server.

Hence, certain embodiments of the present invention may facilitate maintaining persistent communications between a client and a server that is fronted by an SLB. Such embodiments are particularly important in fast-reauthentication applications, wherein the reauthentication-request message must be sent to the original AAA server that initially authenticated the client. Otherwise, full authentication is performed instead of fast reauthentication. Fast reauthentication may be any reauthentication that has been streamlined relative to original authentication. For example, in certain implementations, fast reauthentication does not require an AAA server to access a Home Location Register (HLR).

Full authentication may require that an AAA Server access an HLR to retrieve appropriate authentication information to authenticate a client. Accessing an HLR may be undesirably time consuming and network-resource intensive, which is especially problematic when fast reauthentication would otherwise be available.

For the purposes of the present discussion, authentication or reauthentication information may be any information that may be employed to determine if a client or other network entity is authorized to access a network or to otherwise employ certain services thereof. The terms authentication information and reauthentication information may be employed interchangeably herein. However, reauthentication may be considered a subset or a superset of authentication information without departing from the scope of the present invention. For example, reauthentication information may include additional information over that which is used for initial authentication. The additional information, such as a fast-reauthentication identity or pseudo-IMSI, may be employed specifically for reauthentication.

For the purposes of the present discussion, an authentication server may be any server that is adapted to implement authentication functions to authenticate or authorize a network entity, such as a client, to use certain services provided by the network. Authentication functions may include tracking network service usage by a client, maintaining billing information for services used by a client, and so on.

A server may be any computer program, which may be implemented in hardware and/or software, that can provide data and/or functions to another network entity, such as another program or module, in response to a query from the other program or module or via a push to the other program or module. An AAA server may be any authentication server that may authenticate a client and also authorize the client to use a given network service or functionality and to account for or to otherwise quantify services used by the client.

For clarity, various well-known components, such as power supplies, modems, Serving GPRS (Generic Packet Radio Services) Support Nodes (SGSNs), firewalls, network cards, Internet Service Providers (ISPs), Internet Protocol SECurity (IPSEC) concentrators, Media GateWays (MGWs), Mobile Switching Centers (MSCs), cellular Radio Access Networks (RANs), and so on, have been omitted from the figures. However, those skilled in the art with access to the present teachings will know which components to implement and how to implement them to meet the needs of a given application.

FIG. 1 is a diagram illustrating a UMA network 10 adapted to facilitate persistent communications between a client 12, called a mobile station, and an AAA server 30 to facilitate fast reauthentication according to an embodiment of the present invention. The UMA network 10, which may also be considered a Generic Access Network (GAN), includes plural clients 16 in communication with Access Points (APs) 18. For illustrative purposes, the clients 16 are shown including the mobile station 12, which wirelessly communicates with an AP 26 among the APs 18. A mobile station may be any device that can communicate wirelessly with a network. Examples of mobile stations include wireless phones, laptops with IEEE 802.11 wireless cards, Bluetooth devices, WiMax (IEEE 802.16) devices, other wireless clients, and so on.

The APs 18 communicate with a UMA Controller (UNC) 22 via an IPSEC tunnel established through an intervening Internet Protocol (IP) access network 20. IPSEC tunnel connects the AP 26 to a Security GateWay (SGW) 28 in the UNC 22. The SGW 28 communicates with plural AAA servers 24, including a first AAA server 30 and an $N^{th}$ AAA server 32, via a Server Load Balancer (SLB) 34 that fronts the AAA servers 24. An SLB is said to front a server when traffic to and from the server and an outside network, such as the packet-switched network passes through the SLB. An SLB may run one or more algorithms for selectively balancing or distributing traffic to/from servers fronted by the SLB.

To facilitate persistent communications between the clients 16 and the AAA servers 24, additional modules are added to the network 10. In particular, the first AAA server 30 includes a first fast-reauthentication module 34, which includes a sub-realm-appending module 36. The mobile station 12 includes a second fast-reauthentication module 38, which includes sub-realm information 40 obtained from an AAA server, such as the first AAA server 30.

For the purposes of the present discussion, sub-realm information may be any information added to a message, such as information identifying an originator of the message. Characters added to a pseudo-IMSI identifying a real server; or information incorporated within a sub-domain portion of a RADIUS payload message identifying a real server, are considered sub-realm information.

In operation, when the mobile station 12 initially connects to the SGW 28, the SGW 28 employs an AAA server, such as the first AAA server 30, to authenticate the mobile station 12. The SLB 34, which may be implemented as an Internetwork Operating System (IOS) SLB, initially determines which of the AAA servers 24 to employ to authenticate the client 12. The determination may be based on server load and other factors.

In the present operative scenario, the SGW 28 employs the first AAA server 30 to perform initial full authentication of the client 12. The full authentication may involve accessing an HLR (not shown) and performing various tasks in accordance with Extensible Authentication Protocol (EAP)-Subscriber Identity Module (SIM) techniques involving Remote Authentication Dial-In User Service (RADIUS) protocols.

The first fast reauthentication module 34 employs the sub-realm-appending module 36 to append sub-realm information along with a pseudo-IMSI (pseudo-IMSI@sub-realm) to a RADIUS access-accept message sent from the first AAA Server 30 to the mobile station 12 after initial authentication. Authentication and reauthentication information and associated messages, such as RADIUS messages that are transmitted between the AAA server 30 and the mobile station 12, are encrypted to prevent intermediary devices from deciphering the messages and obtaining the accompanying information.

The sub-realm information is cached or otherwise stored as the sub-realm information 40 at the mobile station 12. The sub-realm information 40 identifies the first AAA Server 30, while the pseudo-IMSI represents an identification number usable by the client 12 for fast reauthentication as discussed more fully below.

As part of the sub-realm information, the sub-realm-appending module 36 may insert a server-identifying code in a pseudo-IMSI or otherwise incorporate, such as by prepending or distributing, server-identification information in the RADIUS access-accept message sent to the mobile station 12. Server-identification information may be any information that may specify a server.

The sub-realm information added to the RADIUS access-accept message may be considered a field that contains server-identification information. For the purposes of the present discussion, a field in a message may be any information added to a message. For example, a field may comprise a portion of a string contained in a message, or the field may comprise information that is distributed within a given message or otherwise included in plural fields of a message.

After initial authentication, the mobile station 12 communicates via the network 10 and may access services offered thereby. The services may be provided via one or more additional networks (not shown) that are connected to the network 10 via the SGW 28.

When the mobile station 12 momentarily loses the connection to the network 10, or when a validity period of previously authorized credentials has expired, the mobile station 12 requests reauthentication. The mobile station 12 issues a RADIUS access-request message containing the sub-realm information 40 identifying the first AAA server 30. The sub-realm information 40, which may include a domain name or portion thereof, may be incorporated in a string, such as pseudo-IMSI@server1.com. The RADIUS access-request message is received by the SLB 34.

The SLB 34 includes an expression-matching module 42 that performs regular-expression matching on the received RADIUS access-request message with the sub-realm information 40. Regular-expression matching involves parsing the RADIUS access-request message and matching the sub-realm information 40 with server information maintained by the SLB 34. The SLB 34 maintains server information pertaining to the AAA Servers 24 that it fronts.

After the expression-matching module 42 matches the sub-realm information 40 with corresponding server information maintained by the SLB 34, the SLB 34 forwards the RADIUS access-request message to the real server, i.e., the first AAA Server 30, corresponding to the matched server information.

The SLB 34 may be considered a type of routing module that can route messages among the plural AAA servers 24. For the purposes of the present discussion, a routing module may be any module that is adapted to switch or route a message to a desired destination, such as to a specific server.

Exact details of various modules of the network 10, such as the expression-matching module 42, are application specific. Those skilled in the art with access to the present teachings may readily implement requisite modules and accompanying details to implement embodiments of the present invention without undue experimentation.

Hence, first fast-authentication module 34, the expression-matching module 42, and the second fast-reauthentication module 38, may represent a system for ensuring persistent communications between the mobile station 12 and the first AAA Server 30 for authentication purposes. The system 38, 38, 42 may also represent an IOS RADIUS load-balancing enhancement for EAP-SIM environments, such as UMA environments.

While the present embodiment is discussed with respect to a UMA environment, the system 38, 38, 42 may be adapted for use with other environments, such as a Public Wireless Local Area Network (PWLAN), $3^{rd}$ Generation Partnership Project (3GPP) Generic Access Network (GAN), a cellular network, and so on, without departing from the scope of the present invention.

The system 38, 38, 42 facilitates EAP-SIM fast reauthentication by employing realm-based regular expression matching to facilitate routing client reauthentication messages to a specific real server. For the purposes of the present discussion, EAP-SIM fast reauthentication may be any fast reauthentication performed via one or more EAP-SIM protocols.

The system 38, 38, 42 is particularly beneficial for AAA load-balancing operations in EAP-SIM environments and may be further applicable to IP Multimedia Subsystems (IMS), General Packet Radio Services (GPRS), Universal Mobile Telephone System (UMTS) networks, and so on.

Figure 2:
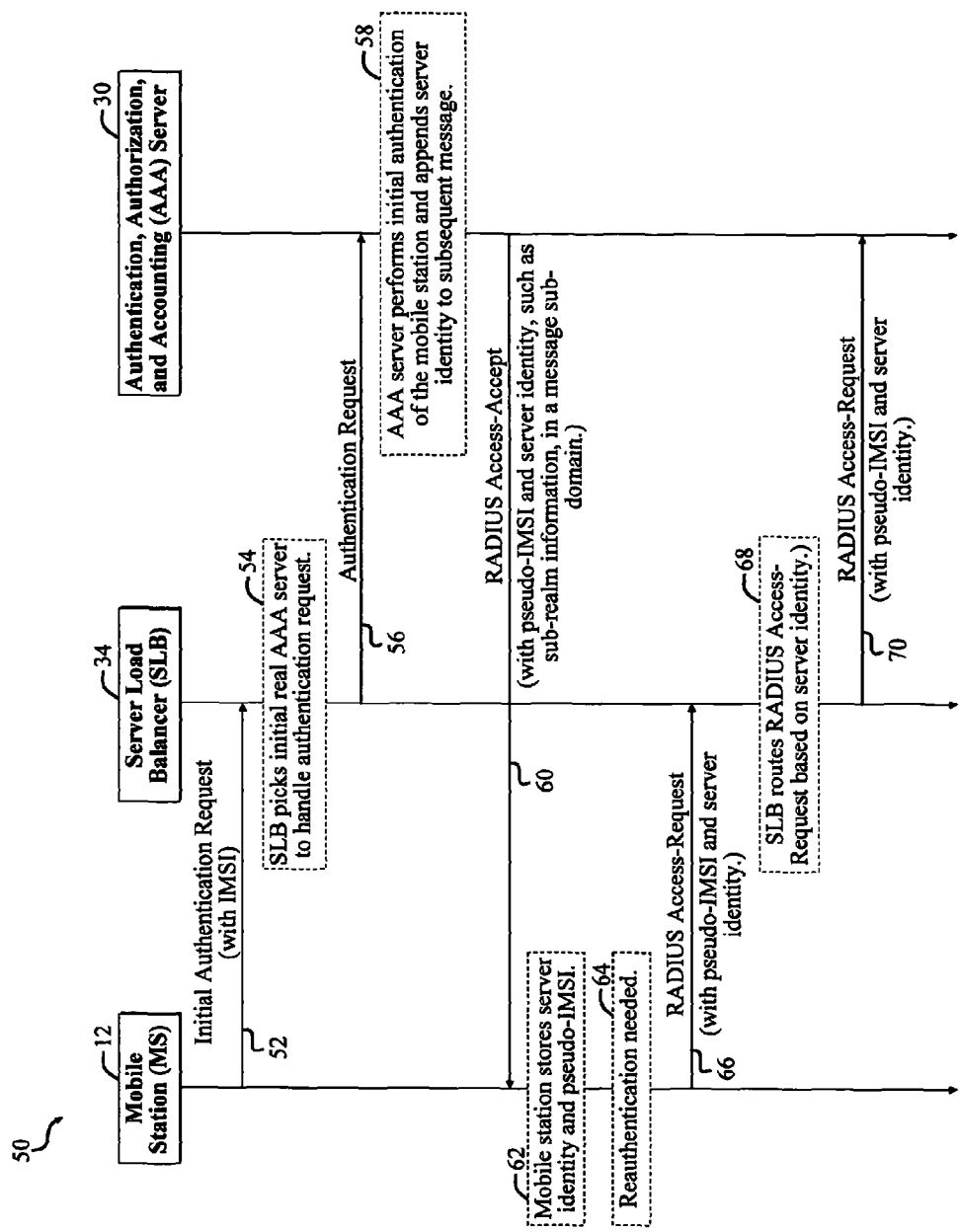
FIG. 2 is a Ping-Pong diagram illustrating an exemplary message sequence between the client and AAA server of FIG. 1.

FIG. 2 is a Ping-Pong diagram illustrating an exemplary message sequence 50 between the mobile station 12 and the first AAA server 30 of FIG. 1. Certain messages may be omitted or added to the sequence 50 without departing from the scope of the present invention.

An authentication-request message 52 is initially sent from the mobile station 12 to the SLB 34. The SLB 34 then picks an initial real AAA server to handle the authentication request in a server-selection step 54. Subsequently, the SLB 34 sends a forwarded authentication request 56 to the selected AAA server 30.

The AAA server then performs an authentication step 58, which involves initially authenticating the mobile station 12 in accordance with the authentication request 56. The authentication step 58 further includes incorporating server-identification information in a RADIUS access-accept message 60. The server-identification information may be appended to the RADIUS access-accept message 60 as sub-realm information that identifies the first AAA server 30. The RADIUS access-accept message 60 is sent by the AAA server 30 to the mobile station 12 via the SLB 34.

The mobile station 12 then stores, in a reauthentication-information-storing step 62, the server-identification information and a pseudo-IMSI provided by the AAA server 30 for fast reauthentication purposes.

Subsequently, when the mobile station 12 needs reauthentication, as determined in a reauthentication-determining step 64, the mobile station 12 sends a RADIUS access-request message 66 to the SLB 34. The RADIUS access-request message 66 includes both a pseudo-IMSI and the server-identification information originally provided to the mobile station 12, in the RADIUS access-accept message 60.

In a subsequent SLB-routing step 68, the SLB 34 sends the RADIUS access-request message 66 to the AAA server 30, which is shown as a routed RADIUS access-request message 70 in FIG. 2. The SLB-routing step 68 may include performing regular-expression matching to extract the server-identification information from the RADIUS access-request message 66 to determine that the message 66 should be routed to the AAA server 30.

Figure 3:
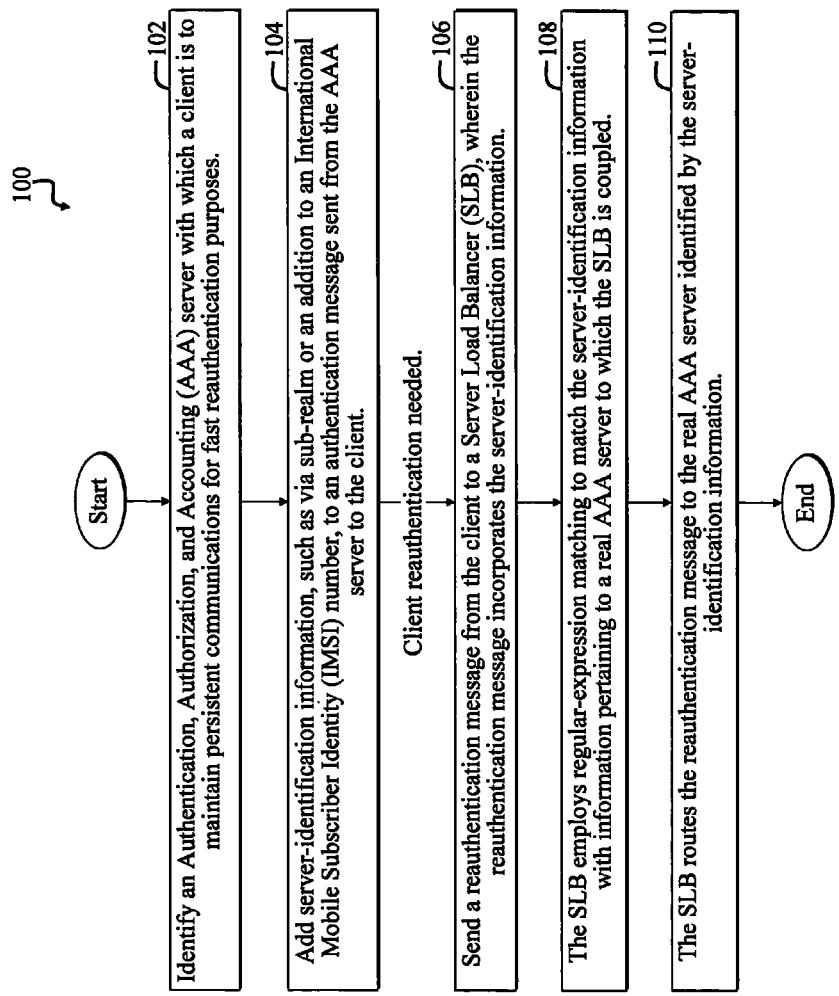
FIG. 3 is a flow diagram of a first method adapted for use with the network of FIG. 1.

FIG. 3 is a flow diagram of a first method 100 adapted for use with the network 10 of FIG. 1. The method 100 includes an initial identifying step 102, wherein an AAA server with which a client is to maintain persistent communications is determined.

Subsequently, an information-adding step 104 includes adding server-identification information to an authentication message sent from the selected AAA server to the client.

Next, when the client attempts fast reauthentication, a message-sending step 106 is performed. The message-sending step includes sending a reauthentication message from the client to an SLB. The reauthentication message incorporates the server-identification information.

In a subsequent message-matching step 108, the SLB employs regular-expression matching to match the server-identification information with information pertaining to a real AAA server to which the SLB is coupled.

Subsequently, a routing step 110 involves the SLB routing the reauthentication to the real AAA server identified by the server-identification information.

Hence, the method 100 ensures that a given client reauthentication session is assigned to the same AAA server that handled the initial client authentication. The communications between the client and the AAA server are said to persist between communication sessions. Persistent communications may be any communications that are maintained as desired between two or more network entities.

FIG. 4 is a flow diagram of a second method 120 adapted for use with the network 10 of FIG. 1. The second method 120 may be considered a more generalized version of the method 100 of FIG. 3. The more generalized method 120 includes a first step 122, wherein authentication information pertaining to a client to be authenticated is obtained. The authentication information includes server-identity information identifying a desired server.

Subsequently, when client reauthentication is desired, a second step 124 is performed. The second step 124 includes employing the authentication information to issue a reauthentication request that includes the server-identity information.

A third step 126 includes employing an SLB to selectively direct the reauthentication request to the desired server based on the server-identity information.

Although embodiments of the invention are discussed primarily with respect to systems and methods for maintain persistent communications between a client and a server that is fronted by an SLB for fast reauthentication purposes, embodiments of the present invention are not limited thereto. Any network entities, not just a client and an AAA server, with which persistent communications may be required, may benefit from incorporating information identifying the network entities within messages exchanged between the network entities in accordance with the present teachings. For example, embodiments of the present invention may be adapted to facilitate persistent communications between a client and a proximity database in a Global Site Selector (GSS) mesh network.

Furthermore, any acceptable architecture, topology, protocols, or other network and digital processing features can be employed. In general, network modules, such as access points, endpoints, and so on, can be implemented via any device with processing ability or other requisite functionality.

Although processes of the present invention and the hardware executing the processes may be characterized by language common to a discussion of the Internet and UMA or GAN networks (e.g., "client," "UNC," "UMA," etc.), it should be apparent that operations of the present invention can execute on any type of suitable hardware in any communication relationship to another device on any type of link or network.

Although a process of the present invention may be presented as a single entity, such as software executing on a single machine, such software can readily be executed on multiple machines. That is, there may be multiple instances of a given software program, a single program may be executing on two or more processors in a distributed processing environment, parts of a single program may be executing on different physical machines, etc. Furthermore, two different programs, such as a client and server program, can be executing in a single machine, or in different machines. A single program can be operating as a client for one information transaction and as a server for a different information transaction.

Any type of processing device can be used as a client. For example, portable computing devices such as a personal digital assistant (PDA), cell phone, laptop computer, or other devices can be employed. In general, the devices and manner of specific processing (including location and timing) are not critical to practicing important features of the present invention.

Although the invention has been discussed with respect to specific embodiments thereof, these embodiments are merely illustrative, and not restrictive, of the invention. Embodiments of the present invention can operate between any two processes or entities including users, devices, functional systems, or combinations of hardware and software. Peer-to-peer networks and any other networks or systems where the roles of client and server are switched, change dynamically, or are not even present are within the scope of the invention.

Any suitable programming language can be used to implement the routines or other instructions employed by various network entities. Exemplary programming languages include C, C++, Java, assembly language, etc. Different programming techniques can be employed such as procedural or object oriented. The routines can execute on a single processing device or multiple processors. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "machine-readable medium" or "computer-readable medium" for purposes of embodiments of the present invention may be any medium that can contain and store the program for use by or in connection with the instruction execution system, apparatus, system or device. The computer-readable medium can be, by way of example only but not by limitation, a semiconductor system, apparatus, system, device, or computer memory.

A "processor" or "process" includes any hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented in whole or in part by using a programmed general purpose digital computer; by using application specific integrated circuits, programmable logic devices, field programmable gate arrays, optical, chemical, biological, quantum or nanoengineered systems or mechanisms; and so on. In general, the functions of the present invention can be achieved by any means as is known in the art. Distributed or networked systems, components, and/or circuits can be used. Communication, or transfer of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow "a", "an", and "the" include plural references unless the context clearly dictates otherwise. Furthermore, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. An apparatus for facilitating persistent communications between entities in a network, the apparatus comprising:
    a server load balancer (SLB), comprising one or more hardware processor, in an unlicensed mobile access system that fronts a plurality of servers such that authentication messages between a client on the network and the plurality of servers pass through the SLB, wherein the SLB is configured to receive a request for an initial authentication from the client that includes a pseudo-initial International Mobile Subscriber Identity (IMSI), and wherein an initial authentication response message generated from a selected one of the plurality of servers that performed the initial authentication is sent to the client, and
    a first module adapted to insert identification information that identifies a selected server of the plurality of servers into an initial authentication response message wherein the initial authentication response message includes fields that identify the selected server and that identify a pseudo-IMSI, which is derived from the initial IMSI, and wherein a Remote Authentication Dial-In User Service (RADIUS) access request message is received from the client as part of a fast reauthentication of the client to facilitate the persistent communication,
    an expression matching module in the SLB, the expression matching module being configured to parse a Remote Authentication Dial-In User Service (RADIUS) access request message from the client and match sub-realm information with server information maintained by the SLB that includes the previously stored sub-realm information associated with the selected server that received the initial authentication from the client, the expression matching module being further configured to use the fields from the RADIUS access request message from the client to selectively route the RADIUS access request message to the selected server for a fast reauthentication of the client to facilitate the persistent communications, wherein the sub-realm information identifies the selected server and the pseudo-IMSI represents an identification number usable for fast reauthentication, and wherein the RADIUS access request message is encrypted to prevent intermediary devices from deciphering the message and obtaining accompanying information;
    wherein the selected server is selected by the SLB to satisfy the initial authentication request based on load balancing from among the plurality of servers.

2. The apparatus of claim 1, wherein the selected server includes:
    an Authentication, Authorization, and Accounting (AAA) server having a fast reauthentication module in the unlicensed mobile access system adapted to append the fields in the initial authentication response message.

3. The apparatus of claim 1, wherein the selected server: is selected by the SLB to satisfy the RADIUS access request based only on the fields from the RADIUS access request message.

4. The apparatus of claim 2, wherein the AAA server, the expression matching module, and the client are adapted to perform Extensible Authentication Protocol (EAP)-Subscriber Identity Module (SIM) fast reauthentication.

5. The apparatus of claim 3, wherein the network includes:
a third generation partnership project network.

6. The apparatus of claim 1, wherein the expression matching module is configured to perform one or more routines for performing regular expression matching to match the fields from the RADIUS access request message with information identifying the selected server to facilitate routing the RADIUS access request message to the selected server.

7. The apparatus of claim 6, wherein the routing module includes:
a RADIUS Internet work Operating System (IOS)-Server Load Balancer (SLB).

8. The apparatus of claim 7, wherein the initial authentication response message includes:
a RADIUS access-request message.

9. The apparatus of claim 1, wherein the initial authentication response message includes:
a RADIUS access-accept message.

10. A method comprising:
obtaining authentication information in an initial authentication response message from a selected of a plurality of servers that are fronted by a server load balancer (SLB) in an unlicensed mobile access system such that authentication messages between a client on a network and the plurality of servers pass through the SLB, wherein the SLB, comprising one or more hardware processor is configured to receive a request for an initial authentication from the client that includes a pseudo-initial International Mobile Subscriber Identity (IMSI), and send an initial authentication response message generated from a selected one of the plurality of servers that performed the initial authentication to the client;
determining that a reauthentication request is to be subsequently received from the client in order to facilitate the persistent communications via a fast reauthentication;
receiving a message with a Remote Authentication Dial-In User Service (RADIUS) access request from the client, wherein the RADIUS access request includes, in fields of the RADIUS access request message, sub-realm information associated with the selected server to which the reauthentication request is to be sent and a pseudo-IMSI that is derived from the initial IMSI, and wherein the client stores the pseudo-IMSI and identifying information associated with the selected server that received the initial authentication from the client;
parsing a Remote Authentication Dial-In User Service (RADIUS) access request message from the client and match sub-realm information with server information maintained by the SLB that includes the previously stored sub-realm information associated with the selected server that received the initial authentication from the client;
and directing the RADIUS access request message from the SLB to the selected server using the field with the identifying information from the RADIUS access request message to perform a fast reauthentication of the client to facilitate the persistent communications, inserting identification information that identifies a selected server of the plurality of servers into an initial authentication response message wherein the initial authentication response message includes fields that identify the selected server and that identify a pseudo-IMSI, which is derived from the initial IMSI,
wherein the sub-realm information identifies the selected server and the pseudo-IMSI represents an identification number usable for fast reauthentication, and wherein the RADIUS access request message is encrypted to prevent intermediary devices from deciphering the message and obtaining accompanying information,
wherein the selected server is selected by the SLB to satisfy the initial authentication request based on load balancing from among the plurality of servers.

11. A server group for facilitating persistent communications between entities in a network, the server group comprising:
a plurality of servers fronted by a server load balancer (SLB) in an unlicensed mobile access system such that authentication messages between a client on the network and the plurality of servers pass through the SLB, wherein the SLB, comprising one or more hardware processor is configured to receive a request for an initial authentication from the client that includes an initial International Mobile Subscriber Identity (IMSI), and send an initial authentication response message generated from a selected one of the plurality of servers that performed the initial authentication to the client, and
a first module adapted to insert identification information that identifies a selected server of the plurality of servers into an initial authentication response message wherein the initial authentication response message includes fields that identify the selected server and that identify a pseudo-IMSI, which is derived from the initial IMSI, and wherein a Remote Authentication Dial-In User Service (RADIUS) access request message is received from the client as part of a fast reauthentication of the client to facilitate the persistent communication,
an expression matching module in the SLB adapted to parse a Remote Authentication Dial-In User Service (RADIUS) access request message from the client and match sub-realm information with server information maintained by the SLB that includes the previously stored sub-realm information associated with the selected server that received the initial authentication from the client, the expression matching module being further configured to use the fields from the RADIUS access request message from the client to selectively route the RADIUS access request message to the selected server for a fast reauthentication of the client to facilitate the persistent communications, wherein the sub-realm information identifies the selected server and the pseudo-IMSI represents an identification number usable for fast reauthentication, and wherein the RADIUS access request message is encrypted to prevent intermediary devices from deciphering the message and obtaining accompanying information
wherein sub-realm information identifies the selected server and the pseudo-IMSI represents an identification number usable for fast reauthentication, and wherein the RADIUS access request message is encrypted to prevent intermediary devices from deciphering the message and obtaining accompanying information,
wherein the selected server is selected by the SLB to satisfy the initial authentication request based on load balancing from among the plurality of servers.

12. The server group of claim 11, wherein the selected server is selected by the SLB to satisfy the reauthentication request based on fields from the RADIUS access request message.

13. The server group of claim 11, wherein the initial authentication response message includes:
a RADIUS access-accept message.

14. The server group of claim 11, wherein the selected server further includes:
   a fourth module that is adapted to append the sub-realm information to the initial authentication response message, wherein the sub-realm information includes information identifying a selected AAA server and the sub-realm information is included in the RADIUS access message.

* * * * *